(12) United States Patent
Chang

(10) Patent No.: US 8,250,710 B2
(45) Date of Patent: Aug. 28, 2012

(54) HINGE

(75) Inventor: Jung-Bin Chang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 287 days.

(21) Appl. No.: 12/790,874

(22) Filed: May 31, 2010

(65) Prior Publication Data

US 2011/0179601 A1    Jul. 28, 2011

(30) Foreign Application Priority Data

Jan. 26, 2010  (CN) ...................... 2010 2 0301555 U
Mar. 17, 2010  (TW) ................................ 99204637 U

(51) Int. Cl.
*E05C 11/08* (2006.01)

(52) U.S. Cl. .............................. 16/340; 16/337; 16/303
(58) Field of Classification Search ............ 16/337–342, 16/303, 330, 319; 361/679.06–679.08, 679.12; 248/921–923

See application file for complete search history.

(56) References Cited

U.S. PATENT DOCUMENTS

| 8,046,875 | B2* | 11/2011 | Wang et al. | 16/338 |
| 8,117,718 | B2* | 2/2012 | Chien | 16/330 |
| 2009/0119872 | A1* | 5/2009 | Chien | 16/2.5 |
| 2010/0000048 | A1* | 1/2010 | Chang | 16/337 |
| 2010/0000370 | A1* | 1/2010 | Chang | 74/567 |
| 2011/0119867 | A1* | 5/2011 | Chen et al. | 16/342 |

* cited by examiner

*Primary Examiner* — Victor Batson
*Assistant Examiner* — Matthew Sullivan
(74) *Attorney, Agent, or Firm* — Altis Law Group, Inc.

(57) ABSTRACT

An interfering assembly of a hinge includes a male element including a first raised portion and a second raised portion, and a female element defining a through hole. A sliding surface apart from a center of the through hole protrudes from the female element. An inner slot and an outer slot are formed beside the sliding surface. The female element defines a first depressed portion and a second depressed portion correspondingly engaged with the first and second raised portions. Widths of the inner slot and the outer slot are gradually varied. During rotation of the rotating member, the first and second raised portions are slid out from the first and second depressed portions, respectively, and then in frictional engagement with the sliding surface, together with partial portions covering the inner and outer slots, correspondingly.

13 Claims, 7 Drawing Sheets

HINGE

BACKGROUND

1. Technical Field

The disclosure relates to a hinge.

2. Description of Related Art

A collapsible device, such as a notebook computer, or a clamshell mobile phone, generally includes a main body hinged to a display.

The hinge includes a fixing member attached to the display, a shaft which is attached to the fixing member, and a rotating member rotatably mounted to the shaft. The shaft has frictional engagement with the rotating member during rotation of the rotating member relative to the fixing member. Therefore, the display can stay positioned at any angle with respect to the main body through friction between the shaft and the rotating member. However, when opening or closing the display relative to the main body, the shaft and the rotating member have the initial static friction to overcome, which requires users to provide extra force to operate the display and occasionally they may inadvertently cause the display to strike the main body with too much force and thus shorten the life of the device. Correspondingly, the display may be difficult to open relative to the main body because of the initial static friction between the shaft and the sleeve. Therefore, it is inconvenient for users and could cause damage to the device. For these reasons, the artwork could be improved.

BRIEF DESCRIPTION OF THE DRAWINGS

Many aspects of the present embodiments can be better understood with reference to the following drawings. The components in the drawings are not necessarily drawn to scale, the emphasis instead being placed upon clearly illustrating the principles of the present embodiments. Moreover, in the drawings, all the views are schematic, and like reference numerals designate corresponding parts throughout the several views.

DETAILED DESCRIPTION

The disclosure, including the accompanying drawings in which like references indicate similar elements, is illustrated by way of examples and not by way of limitation. It should be noted that references to "an" or "one" embodiment in this disclosure are not necessarily to the same embodiment, and such references mean at least one.

Figure 1:
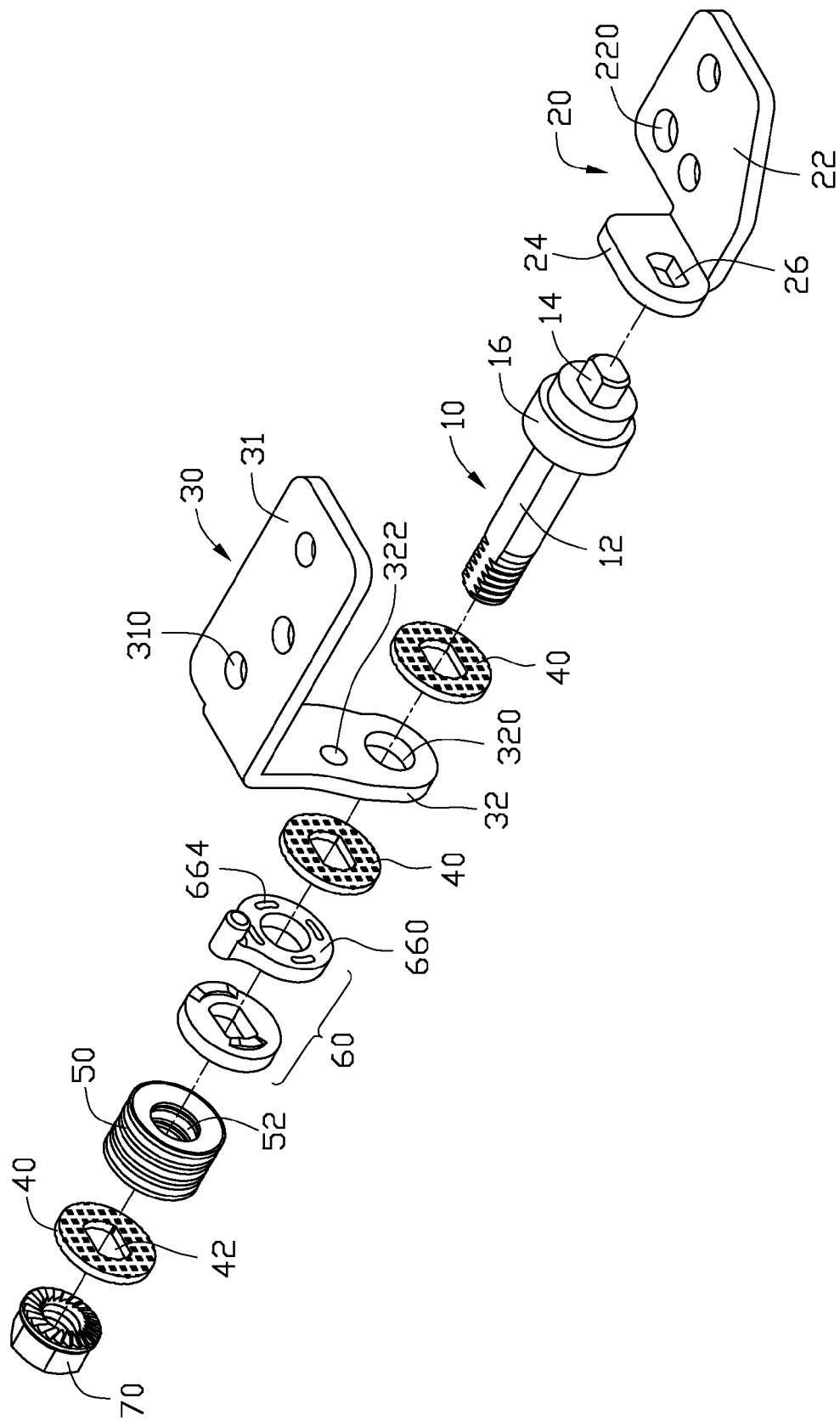
FIG. 1 is an exploded, isometric view of an exemplary embodiment of a hinge, the hinge including an interfering assembly.
Figure 2:
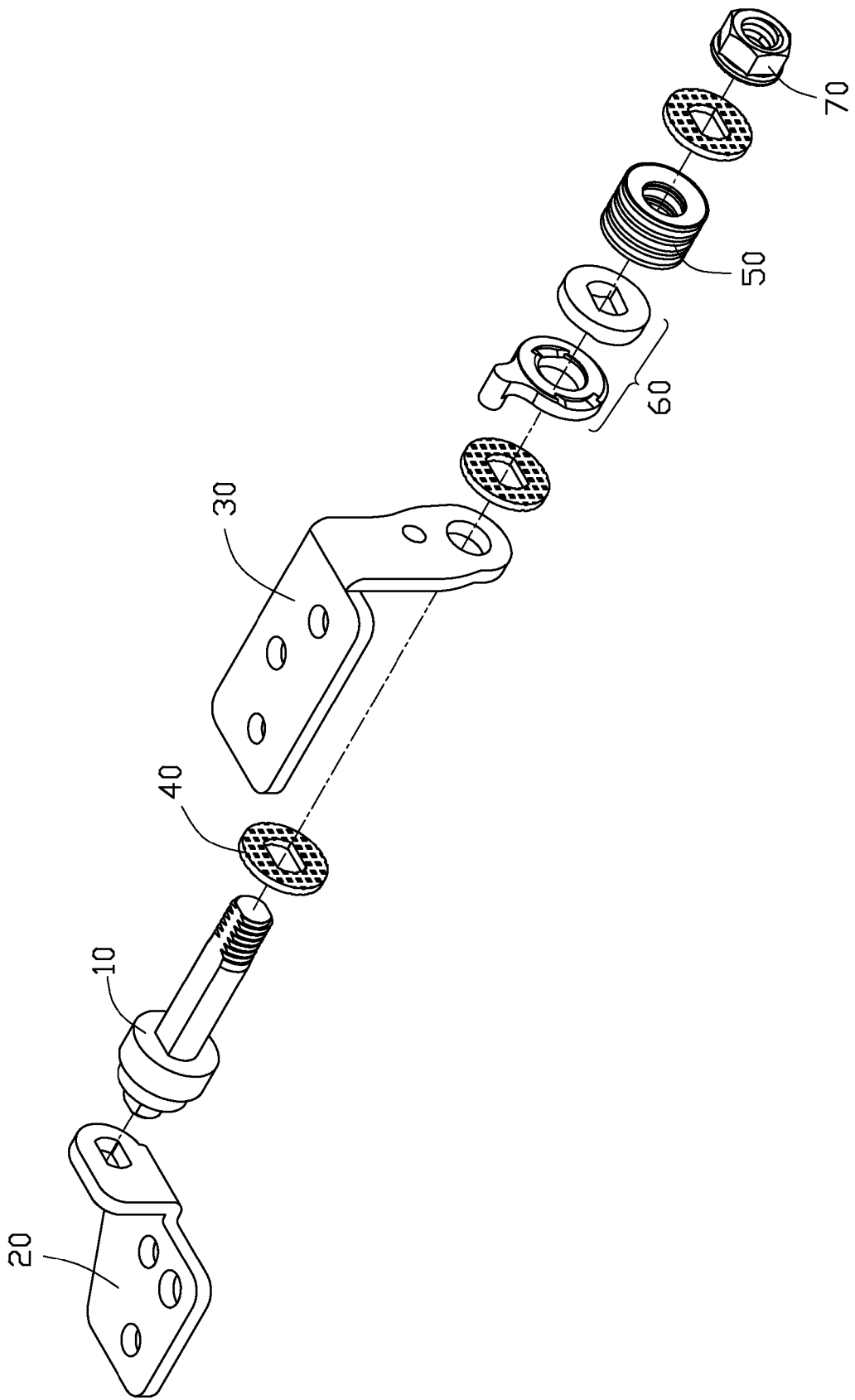
FIG. 2 is similar to FIG. 1, but viewed from another perspective.
Figure 4:
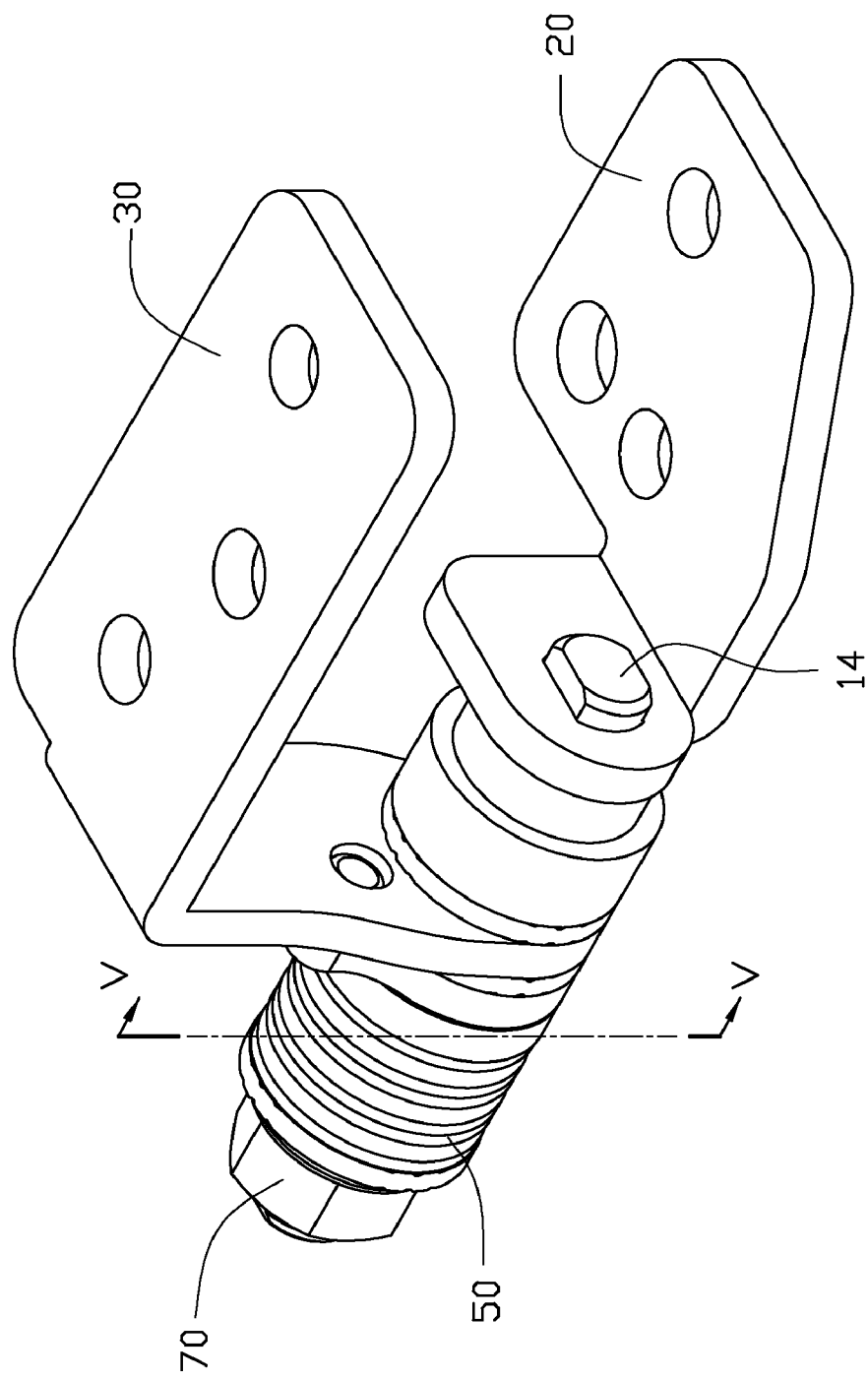
FIG. 4 is an assembled, isometric view of the hinge of FIG. 1.

Referring to FIGS. 1, 2, and 4, in an exemplary embodiment, a hinge includes a shaft 10, a fixing member 20, a rotating member 30, a plurality of washers 40 fixed onto the shaft 10, an elastic assembly 50, an interfering assembly 60, and a fastener 70. In this embodiment, the fastener 70 is a nut.

The shaft 10 includes a fixing portion 14 on the head of the shaft 10 having a double D-shaped cross-section, a shaft post 12 opposite to the fixing portion 14, and a washer-shaped shoulder 16 between the fixing portion 14 and the shaft post 12. The shaft post 12 has a double D-shaped cross-section, and forms a threaded portion (not labeled) on the circumference of a distal end of the shaft post 12, for engaging with the fastener 70. The shoulder 16 has a greater diameter than the shaft post 12.

The fixing member 20 includes a connecting portion 22 defining a plurality of fixing holes 220 therein, and a fixing portion 24 perpendicularly extending from a side of the connecting portion 22. The fixing portion 24 defines a matching hole 26 having a double-D shaped cross-section, corresponding to the fixing portion 14 of the shaft 10, for non-rotatably fixing the shaft 10 to the fixing member 20.

The rotating member 30 is generally L-shaped. The rotating member 30 includes a fixing arm 31 defining a plurality of fixing holes 310 therein, and a pivoting portion 32 extending from an end of the fixing arm 31. The pivoting portion 32 defines a through hole 320, through which the shaft post 12 of the shaft 10 rotatably extends. The pivoting portion 32 defines a securing hole 322, adjacent to the through hole 320.

Each washer 40 defines a double-D shaped fixing hole 42, through which the shaft post 12 of the shaft 10 non-rotatably passes.

The elastic assembly 50 includes a plurality of elastic rings (not labeled) arranged in a line and resisting against each other. Each elastic ring defines a round through hole 52, allowing the shaft post 12 of the shaft 10 to rotatably pass through. The elastic assembly 50 provides elasticity along an axis of the shaft 10, to tighten the interfering assembly 60, the washers 40, and the rotating member 30.

Figure 3:
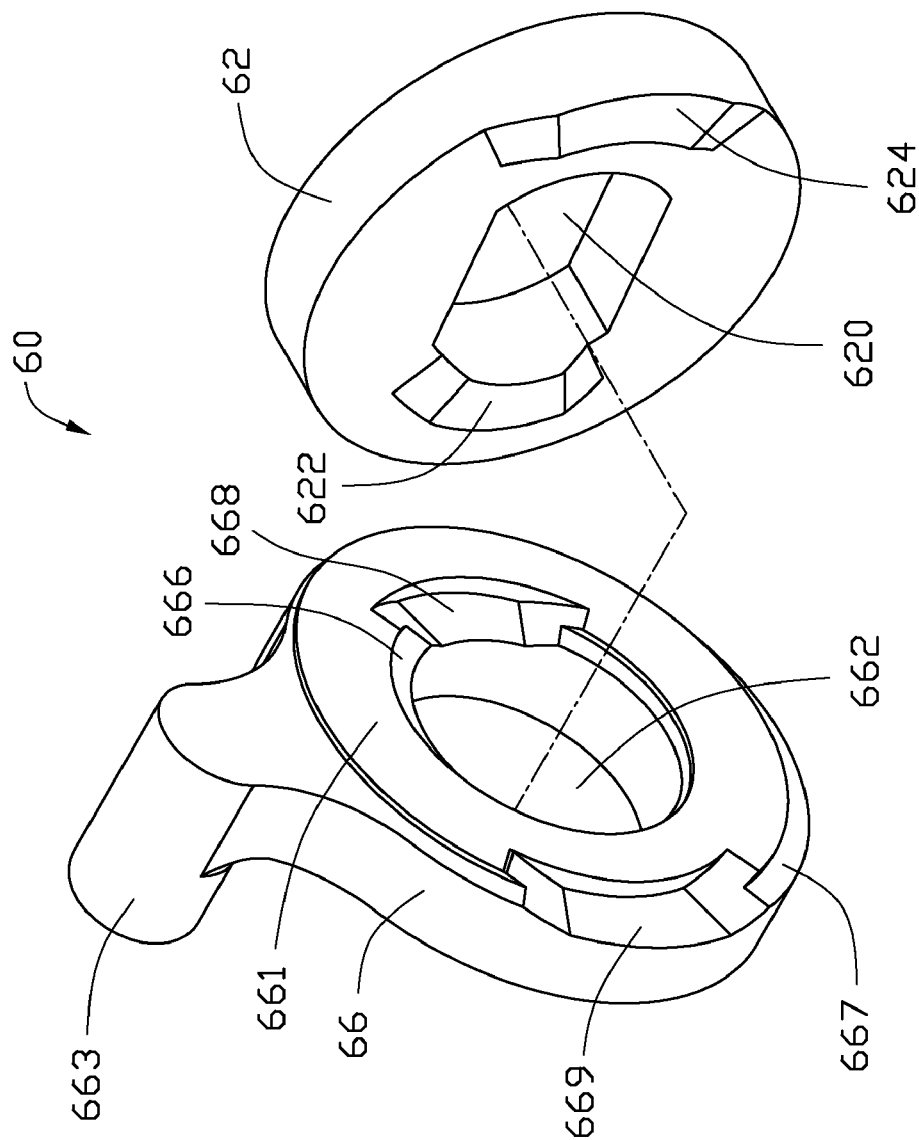
FIG. 3 is an enlarged view of the interfering assembly of FIG. 1, the interfering assembly includes a male element and a female element.

Referring to FIG. 3, the interfering assembly 60 includes a male element 62, and a female element 66 rotated relative to the male element 62.

The male element 62 is generally washer shaped. The male element 62 defines a double-D shaped mounting hole 620 in a center of the male element 62, through which the shaft post 12 of the shaft 10 non-rotatably extends. A first raised portion 622 and a second raised portion 624, both arranged around the mounting hole 620 protrudes from a first side of the male element 62. The first raised portion 622 and the second raised portion 624 are opposite each other, across the mounting hole 620. The first raised portion 622 is adjacent to the mounting hole 620, and the second raised portion 624 is adjacent to a circumference of the male element 62.

The female element 66 is generally washer shaped. The female element 66 defines a through hole 662 in a center of the female element 66, allowing the shaft post 12 of the shaft 10 rotatably extending through. The female element 66 includes a lubricating surface 660 (shown in FIG. 1) defining a plurality of grooves 664 for receiving lubricant. A protrusion (not labeled) extends from a circumference of the female element 66, with a fixing post 663 extending from the protrusion, facing and perpendicular to the lubricating surface 660.

A circular-ring shaped sliding surface 661 protrudes from a side of the female element 66, opposite to the lubricating surface 660. A center of the sliding surface 661 is apart from a center of the through hole 662. Hence, the side of the female element 66 is divided into an inner slot 666 adjacent to the through hole 662, and an outer slot 667 adjacent to the circumference of the female element 66. The sliding surface 661 includes a first depressed portion 668 adjacent to the inner slot 666, and a second depressed portion 669 opposite to the first depressed portion 668, across the through hole 662. The inner slot 666 extends along an edge bounding the through hole 662 from opposite ends of the first depressed portion 668, with gradually diminishing the width of the inner slot 666. Therefore, the width of the inner slot 666 adjacent to the first depressed portion 668 is largest. The second depressed portion 669 is arranged adjacent to the outer slot 667. The outer slot 667 extends along the circumference of the female element 66 from opposite ends of the second depressed portion 669, with gradually diminishing the width of the outer slot 666. Therefore, the width of the outer slot 667 adjacent to the second depressed portion 669 is largest.

Figure 5:
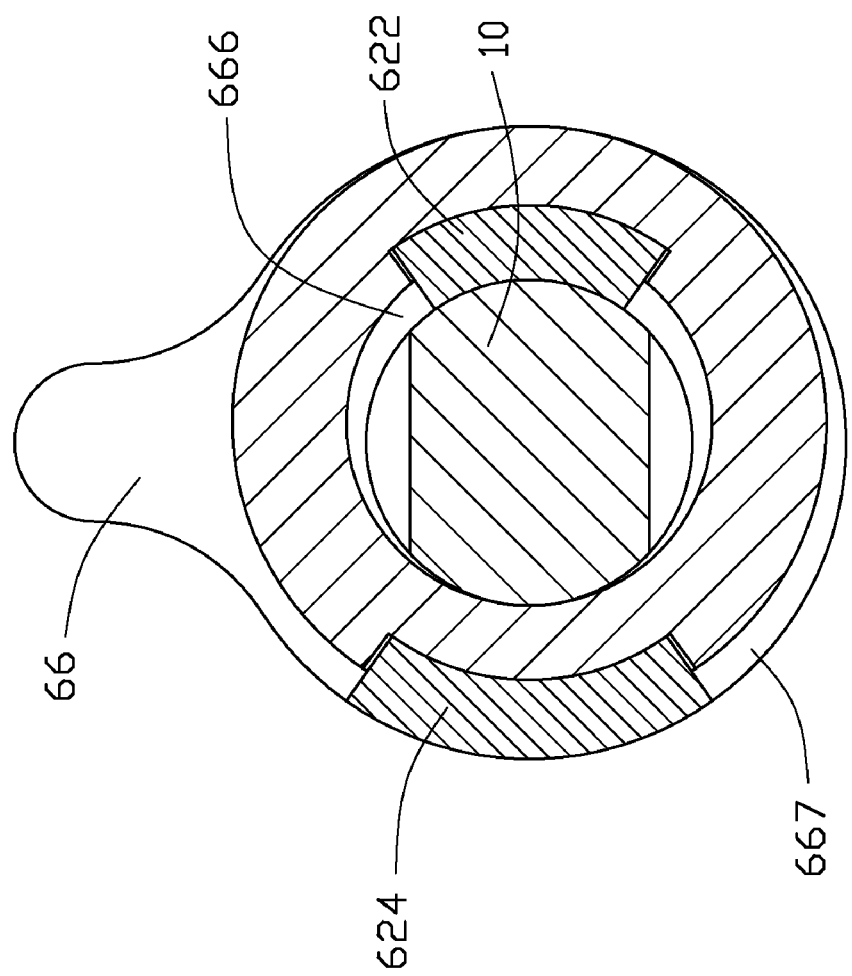
FIG. 5 is a cross-sectional view of FIG. 4, taken along the line V-V.

Referring to FIGS. 4 and 5, in assembly, the fixing portion 14 of the shaft 10 is inserted into the matching hole 26 of the fixing member 20. Thereby, the shaft 10 is non-rotatably fixed to the fixing member 20, with the shoulder 16 of the shaft 10 butting up against the fixing portion 24 of the fixing member 20. The shaft post 12 of the shaft 10 is inserted through the fixing hole 42 of a first washer 40, the through hole 320 of the rotating member 30, the fixing hole 42 of a second washer 40, the through hole 662 of the female element 66, the mounting hole 620 of the male element 62, the through hole 52 of the elastic assembly 50, and the fixing hole 42 of the third washer 40 one by one in that order, with the distal end of the shaft post 12 engaging the fastener 70 to prevent the rotating member 30, the male element 62, the female element 66, the elastic assembly 50, and the washers 40 from disengaging from the shaft 10. In this state, the first and second raised portions 622 and 624 of the male element 62 are engaged in the first and second depressed portions 668 and 669 of the female element 66, correspondingly. The fixing post 663 of the female element 66 is engaged in the securing hole 322 of the rotating member 30, so that the female element 66 can rotate together with the rotating member 30.

Figure 6:
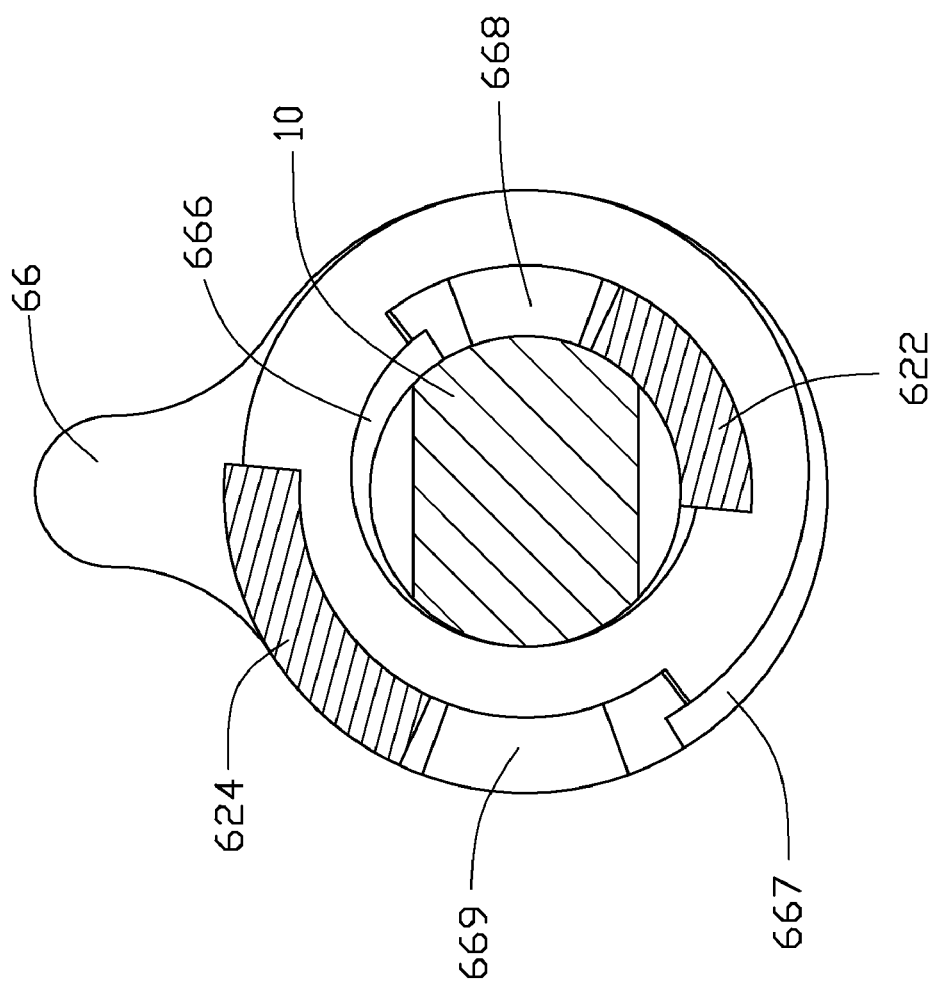
FIG. 6 is similar to FIG. 5, but showing the female element rotated at an angle relative to the male element.

Referring to FIG. 6, in use, the above-mentioned hinge can be utilized in a collapsible device (not shown), such as a notebook computer, that includes a base (not shown) and a cover (not shown) hinged to the base. The rotating member 30 is fixed to the cover through a plurality of fixing holes 310. Correspondingly, the fixing member 20 is fixed to the base through a plurality of fixing holes 220. While opening the cover, the cover is rotated relative to the base, so that the rotating member 30 is rotated relative to the fixing member 20, with the female element 66 rotating relative to the male element 62. Therefore, the first and second raised portions 622 and 624 of the male element 62 are slid out from the first and second depressed portions 668 and 669 of the female element 66, respectively. Thereafter, the first and second raised portions 622 and 624 are in frictional engagement with the sliding surface 661, with partial portions of the first and second raised portions 622 and 624 covering the inner slot 666 and the outer slot 667, correspondingly. In this process, the region of friction between the first and second raised portions 622 and 624 and the sliding surface 661 becomes larger, resulting in increased friction between the male element 62 and the female element 66. Therefore, the cover is easily maintained in a particular position.

When the cover is closed towards the base, the first and second raised portions 622 and 624 of the male element 62 slide along the sliding surface 661 of the female element 66, and is then engaged in the first and second depressed portions 668 and 669 of the female element 66, respectively. In this process, the region of friction between the first and second raised portions 622 and 624 and the sliding surface 661 becomes smaller. As a result, friction between the male element 62 and the female element 66 decreases, so that the cover is easier to close.

Figure 7:
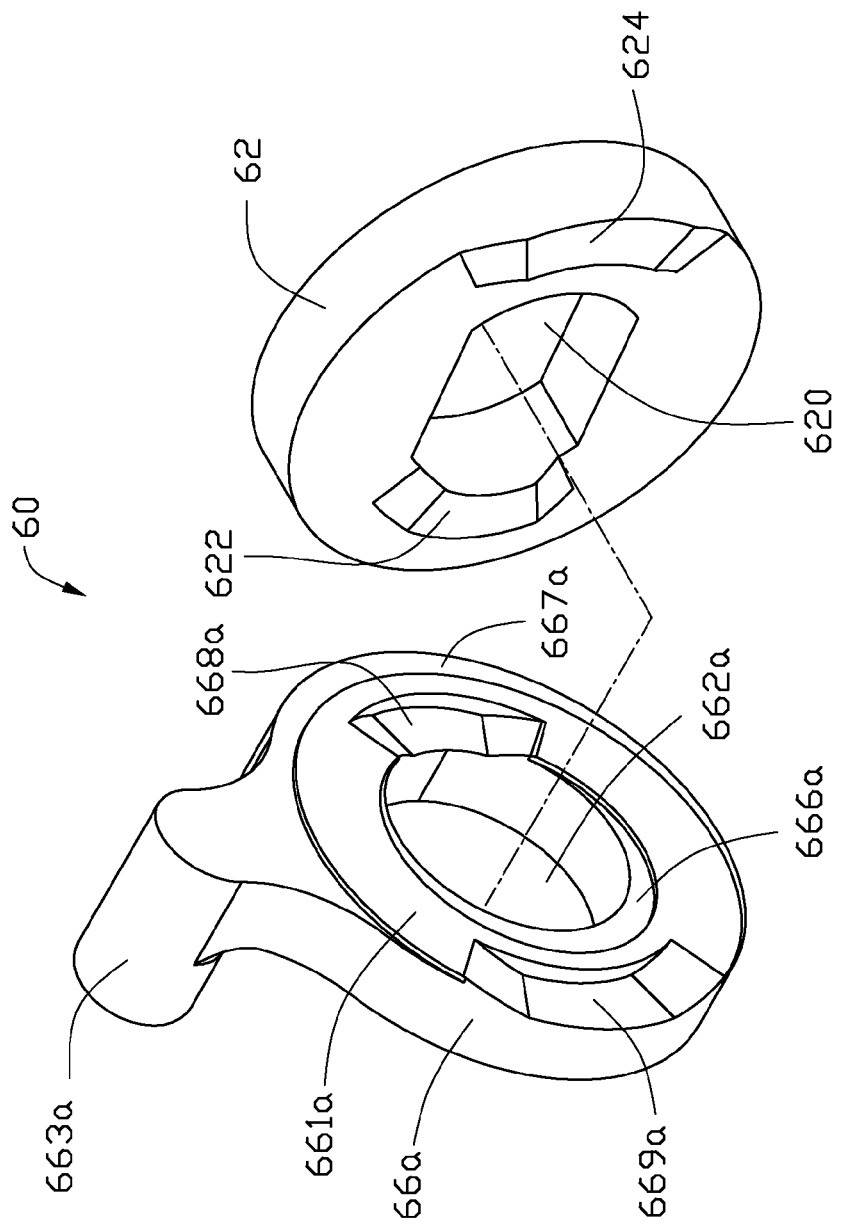
FIG. 7 is an exploded, isometric view an interfering assembly of another embodiment of a hinge.

Referring to FIG. 7, in another embodiment, the female element 66a defines a through hole 662a in a center of the female element 66a. A circular-ring shaped sliding surface 661a protrudes from a side of the female element 66a. A center of the sliding surface 661a is apart from a center of the through hole 662a. Hence, the side of the female element 66a is divided into an inner slot 666a adjacent to the through hole 662a, and an outer slot 667a adjacent to the circumference of the female element 66a. The sliding surface 661a defines a first depressed portion 668a adjacent to the inner slot 666a, and a second depressed portion 669a opposite to the first depressed portion 668a, across the through hole 662a. The inner slot 666a extends along an edge bounding the through hole 662a from opposite ends of the first depressed portion 668a, with the width of the inner slot 666 gradually becoming larger. Therefore, the width of the inner slot 666a adjacent to the first depressed portion 668 is smallest. The second depressed portion 669a is arranged adjacent to the outer slot 667a. The outer slot 667a extends along the circumference of the female element 66a from opposite ends of the second depressed portion 669a, with the width of the outer slot 666 gradually becoming larger. Therefore, the width of the outer slot 667a adjacent to the second depressed portion 669a is smallest.

In use, the female element 66a can be utilized in the aforementioned hinge, to replace the female element 66. When the rotating member 30 is rotated relative to the fixing member 20, with the female element 66a rotating relative to the male element 62, the first and second raised portions 622 and 624 of the male element 62 are slid out from the first and second depressed portions 668a and 669a of the female element 66a, respectively. Thereafter, the first and second raised portions 622 and 624 are under frictional engagement with the sliding surface 661a, with partial portions of the first and second raised portions 622 and 624 covering the inner slot 666a and the outer slot 667a, correspondingly. In this process, the region of friction between the first and second raised portions 622 and 624 and the sliding surface 661a becomes smaller. As a result, friction between the male element 62 and the female element 66a decreases, so that the rotating member 30 is more easily rotated. Obviously, during rotation of the rotating member 30 along a direction opposite to the afore-mentioned, friction between the male element 62 and the female element 66a increases, so that it prevents the cover from closing fast to strike against the base.

It is believed that the present embodiments and their advantages will be understood from the foregoing description, and they will be apparent that various changes may be made thereto without departing from the spirit and scope of the description or sacrificing all of their material advantages, the examples hereinbefore described merely being exemplary embodiment.

What is claimed is:

1. A hinge comprising:
   a fixing member;
   a shaft non-rotatably fixed to the fixing member, the shaft comprising a shaft post;
   a rotating member rotatably sleeved on the shaft post;
   an interfering assembly comprising a male element and a female element rotatable relative to the male element, the male element non-rotatbly fixed to the shaft post, a first raised portion and a second raised portion protruding from the male element, the female element defining a through hole in a center of the female element; wherein the shaft post is rotatably extended through the through hole of the female element, a circularly shaped sliding surface protrudes from a side of the female element, a center of the sliding surface is apart from a center of the through hole, an inner slot adjacent to the through hole and an outer slot adjacent to a circumference of the female element are formed beside the sliding surface, a width of the inner slot is gradually varied along an edge bounding the through hole, and a width of the outer slot is gradually varied along the circumference of the female element; the female element defines a first depressed portion abutting against the inner slot, and a second depressed portion abutting against the outer slot, the first and second depressed portions are correspondingly engaged with the first and second raised portions;

an elastic assembly rotatably sleeved on the shaft post, to provide elasticity along an axis of the shaft post to tighten the interfering assembly and the rotating member; and a fastener fixed to a distal end of the shaft post;

wherein when the rotating member is rotated relative to the fixing member, the first and second raised portions are slid out from the first and second depressed portions, respectively, in frictional engagement with the sliding surface, together with partial portions of the first and second raised portions covering the inner and outer slots, correspondingly, thereafter, the region of friction between the first and second raised portions and the sliding surface is varied.

2. The hinge of claim 1, wherein the inner slot extends along an edge bounding the through hole from opposite ends of the first depressed portion, with gradually diminishing the width of the inner slot, the outer slot extends along the circumference of the female element from opposite ends of the second depressed portion, with gradually diminishing the width of the outer slot.

3. The hinge of claim 2, wherein the male element defines a double-D shaped mounting hole, through which the shaft post non-rotatably extends, the first and second raised portions are around the mounting hole, and opposite each other across the mounting hole.

4. The hinge of claim 3, wherein the first raised portion is adjacent to the mounting hole, and the second raised portion is adjacent to a circumference of the male element.

5. The hinge of claim 2, wherein the rotating member comprises a pivoting portion defining a through hole and a securing hole, the shaft post rotatbly extends through the through hole, a fixing post extends from the female element to engage in the securing hole.

6. The hinge of claim 5, further comprising two washers fixedly fixed to the shaft post, wherein the washers are located at opposite sides of the pivoting portion.

7. The hinge of claim 6, wherein the shaft further comprises a washer-shaped shoulder adjacent to the shaft post, one of the washers abuts against the pivoting portion and the female element, and the other washer abuts against the pivoting portion and the shoulder.

8. The hinge of claim 1, wherein the inner slot extends along an edge bounding the through hole from opposite ends of the first depressed portion, with the width of the inner slot gradually becoming larger, the outer slot extends along the circumference of the female element from opposite ends of the second depressed portion, with the width of the outer slot gradually becoming larger.

9. The hinge of claim 8, wherein the male element defines a double-D shaped mounting hole, through which the shaft post non-rotatably extends, the first and second raised portions are around the mounting hole, and opposite each other across the mounting hole.

10. The hinge of claim 9, wherein the first raised portion is adjacent to the mounting hole, and the second raised portion is adjacent to a circumference of the male element.

11. The hinge of claim 10, wherein the rotating member comprises a pivoting portion defining a through hole and a securing hole, the shaft post rotatbly extends through the through hole, a fixing post extends from the female element to engage in the securing hole.

12. The hinge of claim 11, further comprising two washers fixedly fixed to the shaft post, wherein the washers are located at opposite sides of the pivoting portion.

13. The hinge of claim 12, wherein the shaft further comprises a washer-shaped shoulder adjacent to the shaft post, one of the washers abuts against the pivoting portion and the female element, and the other washer abuts against the pivoting portion and the shoulder.

* * * * *